United States Patent [19]

Kalinowski et al.

[11] Patent Number: 6,130,306
[45] Date of Patent: Oct. 10, 2000

[54] MOISTURE CURABLE OXYALKYLENE POLYMER CONTAINING COMPOSITION

[75] Inventors: Robert Edward Kalinowski, Auburn, Mich.; Andreas Thomas Franz Wolf, Brain-L'Alleud, Belgium

[73] Assignees: Dow Corning S. A., Seneffe, Belgium; Dow Corning Corporation, Midland, Mich.

[21] Appl. No.: 09/266,270

[22] Filed: Mar. 11, 1999

[51] Int. Cl.$^7$ ............................. C08G 77/06; C08G 77/28
[52] U.S. Cl. ............................. 528/34; 525/403; 525/407; 525/409; 528/17; 528/18; 528/30; 528/33; 528/35; 528/901; 556/427
[58] Field of Search ................................... 528/34, 17, 18, 528/30, 33, 35, 901; 556/427; 525/403, 407, 409

[56] References Cited

U.S. PATENT DOCUMENTS

| | | | |
|---|---|---|---|
| 3,971,751 | 7/1976 | Isayama et al. | 260/37 |
| 4,323,488 | 4/1982 | Takago et al. | 528/32 |
| 4,788,254 | 11/1988 | Kawakubo et al. | 525/100 |
| 4,837,274 | 6/1989 | Kawakubo et al. | 525/100 |
| 4,902,575 | 2/1990 | Yukimoto et al. | 428/447 |
| 4,983,700 | 1/1991 | Yukimoto et al. | 528/34 |
| 5,977,225 | 11/1999 | Scholl et al. | 524/262 |

FOREIGN PATENT DOCUMENTS 0 620 241 A1   10/1994   European Pat. Off. ........ C08G 65/32

*Primary Examiner*—Robert Dawson
*Assistant Examiner*—Jeffrey B. Robertson
*Attorney, Agent, or Firm*—William F. Boley

[57] ABSTRACT

A moisture curing composition comprising (a) an oxyalkylene polymer having at least one reactive silicon group in each molecule, (b) bis(3-triethoxysilylpropyl)tetrasulfane, and (c) a condensation catalyst. The presence of the bis(3-triethoxysilylpropyl)tetrasulfane in the composition provides for improved physical properties such as tensile strength and elongation. The present compositions are suitable for use in such applications as sealing materials for construction both in the form of extrudable liquid compositions and as cured preformed configurations such as tapes.

18 Claims, No Drawings

MOISTURE CURABLE OXYALKYLENE POLYMER CONTAINING COMPOSITION

BACKGROUND OF INVENTION

The present invention is a moisture curing composition comprising (a) an oxyalkylene polymer having at least one reactive silicon group in each molecule, (b) bis(3-triethoxysilylpropyl)tetrasulfane, and (c) a condensation catalyst. The presence of the bis(3-triethoxysilylpropyl) tetrasulfane in the composition provides for improved physical properties such as tensile strength and elongation. The present compositions are suitable for use in such applications as sealing materials for construction both in the form of extrudable liquid compositions and as cured preformed configurations such as tapes.

Typical moisture curable polymers include curable polyorganosiloxanes having a polyorganosiloxane backbone and at least one reactive silicon group which reacts with moisture to form siloxane bonds. However, such curable polyorganosiloxanes have several limitation including their expense and lack of paintability. Oxyalkylene polymers having reactive silicone groups that are crosslinkable in the presence of moisture to form siloxane bonds have been proposed as an alternative to such curable polyorganosiloxane compositions. Although such oxyalkylene polymer containing compositions overcome at least partially the above described limitations of the polyorganosiloxane compositions, they could still benefit from improve properties such as tensile and elongation.

Isayama et al., U.S. Pat. No. 3,971,751, describe methods for making polyether polymers having reactive silicon groups and compositions comprising these polymers which are curable to a rubber-like substance upon exposure to moisture.

Takago et al., U.S. Pat. No. 4,323,488, describe a method for making allyl-terminated polyoxyalkylene polyethers and curable compositions containing such polymers.

Kawakubo et al., U.S. Pat. No. 4,788,254, describe a moisture curable polymer composition comprising (a) an organic polymer having at least one reactive silicon group in a molecule and (b) a compound having one silanol group in a molecule or a compound which reacts with moisture to form a compound having one silanol group in a molecule. The composition is reported to have improved tensile strength and surface characteristics.

Kawakubo et al., U.S. Pat. No. 4,837,274, describe a curable composition comprising an organic polymer containing at least one reactive silicon functional group crosslinkable to produce an elastomer by the formation of a siloxane bond and an organosilicon compound having a molecular weight of not less than 140. The cured composition is reported to having excellent modulus, elongation, and storage stability.

Yukimato et al., U.S. Pat. No. 4,983,700, describe a curable composition comprising an (a) oxyalkylene base polymer having at least one reactive silicon-containing group bonded to a silicon atom, (b) at least one compound selected from the group consisting of a compound having one silanol group in the molecule and a compound which when reacted with moisture, generates a compound having one silanol group in the molecule, (c) a compound having a silicon-containing group to the silicon atom of which two hydrolyzable groups are bonded, and (d) a compound having a silicon-containing group to the silicon atom of which three hydrolyzable groups are bonded and an amino group, which composition provides a cured material having low modulus, good bond strength, and improved weather resistance of the bond strength.

Hasegawa et al., EP 0-620-241 A1, describe a curable composition comprising an oxyalkylene polymer having a silicon atom-containing group to which a hydroxyl group or a hydrolyzable group is bonded and capable of crosslinking to form a siloxane bond, and a hydrolyzable silicon compound. The addition of the hydrolyzable silicon compound is reported to improve adhesion of the cured compositions to substrates and markedly improved water-resistant adhesion.

SUMMARY OF INVENTION

The present invention is a moisture curing composition comprising (a) an oxyalkylene polymer having at least one reactive silicon group in each molecule, (b) bis(3-triethoxysilylpropyl)tetrasulfane, and (c) a condensation catalyst. The presence of the bis(3-triethoxysilylpropyl) tetrasulfane in the composition provides for improved physical properties such as tensile strength and elongation. The present compositions are suitable for use in such applications as sealing materials for construction both in the form of extrudable liquid compositions and as cured preformed configurations such as tapes.

DESCRIPTION OF INVENTION

The present invention is a curable composition comprising the product obtained upon combining components comprising (A) 100 parts by weight of oxyalkylene polymer having at least one silicon atom containing-group per molecule to which a hydroxyl group or a hydrolyzable group is bonded and capable of crosslinking through the formation of a siloxane bond, (B) about 0.1 to 20 parts by weight of bis(3-triethoxysilylpropyl)tetrasulfane, and (C) an amount of a condensation catalyst sufficient to effect cure of the composition upon exposure to moisture.

The oxyalkylene polymers having at least one silicon atom containing-group per molecule to which a hydroxyl group or a hydrolyzable group is bonded (hereinafter in the alternative referred to as "reactive silicon functional group") comprising component (A) of the present composition are well known and are described in, for example, U.S. Pat. No. 3,971,751, U.S. Pat. No. 4,902,575, and U.S. Pat. No. 4,323,488, which are hereby incorporated by reference as teaching such polymers and their methods of preparation.

The molecular chain of the oxyalkylene polymer comprising component (A) preferably has a recurring unit that is represented by general formula $$-R^1-O- \tag{1}$$

where $R^1$ is a substituted or unsubstituted divalent hydrocarbon group having 1 to about 8 carbon atoms, preferably a hydrocarbon group having 3 or 4 carbon atoms. Specific examples of $R^1$ include $-CH(CH_3)CH_2-$, $-CH(C_2H_5)CH_2-$, $-C(CH_3)_2CH_2-$, and $-CH_2CH_2CH_2CH_2-$. The molecular chain of the oxyalkylene polymer can be composed of recurring units of a single type or two or more different types. Preferred is when $R^1$ is described by formula $-CH(CH_3)CH_2-$. The molecular chain of the oxyalkylene polymer can contain recurring units other than $-R^1-O-$. In such a case it is preferable that the amount of the recurring units of $-R^1-O-$ in the oxyalkylene polymer exceed 60 weight percent of the polymer and preferably 80 weight percent of the polymer.

The oxyalkylene polymer of the present invention preferably has a number average molecular weight of from about 500 to 50,000. Preferred is when the oxyalkylene polymer has a number average molecular weight of about 3,000 to 30,000.

The reactive silicon functional groups substituted on the oxyalkylene polymer which are capable of crosslinking to form siloxane bonds are well known in the art and are characterized by their ability to crosslink even at room temperature in the presence of moisture and a suitable condensation catalyst. Examples of such reactive silicon functional groups are described by general formula (2)

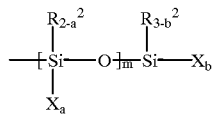

where each $R^2$ is an independently selected substituted or unsubstituted monovalent organic group having 1 to about 20 carbon atoms, X is a hydroxyl group or a hydrolyzable group; a=0, 1, or 2; b=0, 1, 2, or 3; with the proviso that $1 \leq a+b$ and preferably $1 \leq a+b \leq 4$; and m is 0 or an integer of 1 to about 19. Not all of the m units in the above general formula (2) need be the same.

Preferred reactive silicon groups are described by general formula (3)

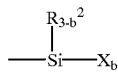

where $R^2$, X, and b are the same as described above.

Specific examples of the hydrolyzable group X in formulas (2) and (3) include a halogen atom, a hydrogen atom, an alkoxy group, an acyloxy group, a ketoximo group, an amino group, an amido group, an aminooxy group, a mercapto group, and an alkenyloxy group. It is preferred that X be an alkoxy group comprising 1 to about 6 carbon atoms, with X being methoxy or ethoxy most preferred.

Specific examples of $R^2$ in formulas (2) and (3) include alkyl groups having 1 to about 20 carbon atoms such as methyl and ethyl; cycloalkyl groups having 3 to about 20 carbon atoms such as cyclohexyl and cyclopentyl; aryls groups having 6 to about 20 carbon atoms such as phenyl, tolyl, and naphthyl; and aralkyl groups having 7 to about 20 carbon atoms such as benzyl. In formulas (2) and (3), $R^2$ may be a triorganosiloxy group described by formula $R^3_3SiO—$, where each $R^3$ is an independently selected substituted or unsubstituted monovalent organic group, preferably a hydrocarbon group having 1 to about 20 carbon atoms such as methyl or phenyl. Preferred is when $R^2$ is methyl.

The number of reactive silicon groups substituted on the oxyalkylene polymer must be at least one per molecule and is preferably an average of about 1.1 to 10. More preferred is when an average of about 1.2 to 5 reactive silicon groups are substituted on the oxyalkylene polymer. A preferred oxyalkylene polymer for use in the present composition is an oxypropylene polymer having a number average molecular weight within a range of about 3,000 to 30,000 which is end-terminated with dimethoxymethylsilyl groups.

The present composition comprises about 0.1 to 20 parts by weight of bis(3-triethoxysilylpropyl)tetrasulfane per 100 parts of component (A). Preferred is when the present composition comprises about 0.5 to 15 parts of bis(3-triethyloxysilylpropyl)tetrasulfane per 100 parts of component (A).

The present composition comprises an amount of a condensation catalyst sufficient to effect cure of the composition upon exposure to moisture. Generally any of those catalyst known in the art suitable for effecting silanol condensation may be used. Examples of usable catalysts include titanic acid esters such as tetrabutyl titanate and tetrapropyl titanate; tin carboxylates such as dibutyltin dilaurate, dibutyltin maleate, dibutyltin diacetate, tin octylate, and tin naphthenate; the reaction product of dibutyltin oxide and a phthalic ester; dibutyltin diacetylacetonate; amine compounds, such as butylamine, octylamine, dibutylamine, monoethanolamine, diethanolamine, and triethanolamine; and salts of these amine compounds such as those with carboxylic acids. A preferred catalyst is a tin carboxylate, with dibutyltin dilaurate being most preferred.

The amount of condensation catalyst added to the present composition can be any such amount that facilitates the curing of the composition through the formation of siloxane bonds. Generally, an amount from about 0.01 to 20 parts by weight of catalyst per 100 parts by weight of component (A) may be added to the present composition. Preferred is when about 0.1 to 10 parts by weight of catalyst is added per 100 parts by weight of component (A).

If desired, the present composition may further contain various fillers, plasticizers, and compounding additives. Suitable fillers may include reinforcing fillers such as fumed silica, precipitate silica, anhydrous silicic acid, and carbon back; fillers such as calcium carbonate, magnesium carbonate, diatomaceous earth, calcined clay, kaolin, talc, titanium oxide, bentonite, organic bentonite, ferric oxide, zinc oxide; and various other fillers such as glass fibers and filaments. The fillers may typically be added to the present composition in an amount of from about 3 to 300 parts by weight per 100 parts by weight of component (A).

Plasticizers which may be used in the present composition include phthalic esters such as dioctyl phthalate, dibutyl phthalate, and butyl benzyl phthalate; epoxy plasticizers such as a benzyl epoxystearate; polyesters prepared from a dibasic acid and a dihydric alcohol; polyethers such as polypropylene glycol; styrene polymers such as polymethylstyrene and polystyrene; polybutadiene, butadiene-acrylonitrile copolymers, polyisoprene, polybutene, and chlorinated parafins. These plasticizers may be used individually or in combination of two or more. The plastizer is preferably used in the present composition in an amount of from 0 to about 10 parts by weight per 100 parts by weight of component (A).

Other additives which may be used in the present composition include desiccants, storage stability improving agents, ultraviolet absorbents, metal deactivators, antiozonants, photo stabilizers, anti-sag agents, colorants, and antioxidants.

The present composition may be packaged as a two-package system with the component (A) and component (C) in different packages, the contents of which are mixed prior to use. Preferred is when the present composition is prepared as a composition comprising components (A), (B), and (C) and stored under substantially water-free conditions. Such a composition rapidly starts curing from its surface upon exposure to air and the moisture contained therein.

The present composition is especially useful as an elastic sealing compound in the field of construction and engineering works. The composition may be placed onto the construction to be sealed as a viscous liquid which then cures in place to form a seal, or may be used to form cured extrusions such as a tape which may be adhered to for example a cured silicone sealant placed in a seam. The present composition may also be used as a paint, an adhesive, an impregnating agent, and a coating material. The present compositions have improved physical properties such as elongation and tensile strength and may have improved adhesion to substrates, when compare to similar compositions without the addition of bis(3-triethoxysilylpropyl)tetrasulfane.

The following examples are provided to illustrate the present invention. These examples are not intended to limit the claims herein.

A curable reactive silicon group-containing polyoxypropylene composition was prepared and various levels of bis(3-triethoxysilylpropyl)tetrasulfane were added to the composition to assess the effect on physical properties of the cured composition. The trade name of components of the composition and their descriptions are described in Table 1 and a description of the compositions tested is provided in Table 2.

The curable reactive silicon group-containing polyoxypropylene composition was prepared by adding to a mixer a 30/70 weight ratio of Excestar S2410 and S2420 along with dioctyl phthalate plasticizer. These components where mixed under vacuum for 15 minutes with stirring. Precipitated calcium carbonate (Winnofil SPM) and ground calcium carbonate (Gammasperse CS-11) were blended together and added in 2–3 increments to the above prepared mixture and these fillers thoroughly dispersed in the mixture. Titanium dioxide (DuPont R-100) was add next and mixed into the mixture. Then a thickening agent (Polyvest C-70) and UV stabilizers (Tinuvin 328 and 292) were added and mixed into the mixture. Vinyltrimethoxysilane was added to the mixture as a dehydrating agent and Si69 (bis(3-triethoxysilylpropyl)tetrasulfane) was added to the mixture. Then, dibutyltin dilaurate was added to the mixture as catalyst and the resulting mixture mixed for 5 minutes under strong vacuum. The resulting curable reactive silicon group-containing polyoxypropylene composition was placed in plastic cartridges and centrifuged for 20 minutes. The composition was allowed to age in the cartridges for 14 days prior to testing.

Samples of the different compositions were cast into configurations for physical property testing according to ASTM 412 for modulus, tensile, and elongation. Shore A Durometer of the cured composition was determined by ASTM 2240. The physical properties of the cured compositions were tested at 2, 4, and 8 weeks after preparation, with the samples being stored under ambient conditions until tested and the results of this testing are provided in Tables 3a–3c.

TABLE 1

| Trade Name | Manufacturer | Description |
| --- | --- | --- |
| Excestar S2410 | Asahi Glass Company, Tokyo, Japan | methyldimethoxysilyl functional polyoxypropylene, Visc. 18,000 mPa · s |
| Excestar S2420 | Asahi Glass Company, Tokyo, Japan | methyldimethoxysilyl functional polyoxypropylene, Visc. 18,000 mPa · s |
| Polyvest C-70 | Huels Aktiengesellschaft, Germany | carboxylic functional polybutadiene |
| Winnofil SPM | Zeneca, UK | precipitated calcium carbonate |
| Gammasperse CS-11 | Georgia Marble, USA | ground calcium carbonate |
| Dupont R-100 | Dupont White Pigment and Mineral Products Division, Wilmington, DE, USA | rutile $TiO_2$ |

TABLE 1-continued

| Trade Name | Manufacturer | Description |
| --- | --- | --- |
| Tinuvin 328 | Ciba Specialty Chemicals NV, Benelux, Belgium | 2-(2H-benzotriazole-2-yl)-4,6-bis-(1,1-dimethylpropyl) |
| Tinuvin 292 | Ciba Specialty Chemicals NV, Benelux, Belgium | mixture of methyl and bis-(1,2,2,6,6-pentamethyl-4-piperidyl) sebacate |
| Degussa Si69 | Degussa Corporation | bis(3-triethoxysilylpropyl) tetrasulfane |

TABLE 2

Compositions Descriptions

| | Weight Parts Composition Number | | | | |
| --- | --- | --- | --- | --- | --- |
| Component Description | 1 | 2 | 3 | 4 | 5 |
| Excestar S2410 | 30 | 30 | 30 | 30 | 30 |
| Excestar S2420 | 70 | 70 | 70 | 70 | 70 |
| Dioctylphthalate | 90 | 90 | 90 | 90 | 90 |
| Winnofil SPM | 180 | 180 | 180 | 180 | 180 |
| Gammasperse CS-11 | 54 | 54 | 54 | 54 | 54 |
| Dupont R-100 | 20 | 20 | 20 | 20 | 20 |
| Polyvest C-70 | 2 | 2 | 2 | 2 | 2 |
| Tinuvin 328 | 1 | 1 | 1 | 1 | 1 |
| Tinuvin 292 | 1 | 1 | 1 | 1 | 1 |
| ViSi(OMe)$_3$* | 3 | 3 | 3 | 3 | 3 |
| Hexamethyldisilazane | 3 | 3 | 0 | 0 | 0 |
| Si69 | 0 | 1 | 1 | 5 | 10 |
| Dibutyltin dilaurate | 0.6 | 0.6 | 0.6 | 0.6 | 0.6 |

*Vi = vinyl and Me = methyl

TABLE 3a

Physical Properties of Cured Compositions at Two Weeks

| | Composition Number | | | | |
| --- | --- | --- | --- | --- | --- |
| Test Method | 1 | 2 | 3 | 4 | 5 |
| 100% Modulus | 121 | 136 | 52 | 47 | 62 |
| 400% Modulus | 197 | 232 | 85 | 84 | 112 |
| 800% Modulus | — | — | 147 | — | — |
| Tensile(MPa) | 1.47 | 2.34 | 1.03 | 0.87 | 0.88 |
| Elongation (%) | 481 | 764 | 848 | 705 | 521 |
| Durometer (Shore A) | 30 | 34 | 20 | 17 | 18 |

TABLE 3b

Physical Properties of Cured Compositions at Four Weeks

| | Composition Number | | | | |
| --- | --- | --- | --- | --- | --- |
| Test Method | 1 | 2 | 3 | 4 | 5 |
| 100% Modulus | 124 | 153 | 74 | 77 | 97 |
| 400% Modulus | 200 | 234 | 108 | 125 | 156 |
| 800% Modulus | — | — | 169 | 197 | 240 |
| Tensile(MPa) | 1.47 | 2.50 | 1.85 | 1.48 | 1.70 |
| Elongation (%) | 464 | 783 | 1249 | 916 | 803 |
| Durometer (Shore A) | 29 | 35 | 37 | 27 | 30 |

TABLE 3c

Physical Properties of Cured Compositions at Four Weeks

| Test Method | Composition Number | | | | |
|---|---|---|---|---|---|
| | 1 | 2 | 3 | 4 | 5 |
| 100% Modulus | 129 | 153 | 79 | 94 | 107 |
| 400% Modulus | 208 | 250 | 114 | 148 | 170 |
| 800% Modulus | — | — | 176 | 231 | 268 |
| Tensile(MPa) | 1.53 | 2.35 | 1.99 | 1.80 | 1.88 |
| Elongation (%) | 470 | 690 | 1285 | 951 | 804 |
| Durometer (Shore A) | 31 | 35 | 27 | 28 | 32 |

We claim:

1. A curable composition comprising the product obtained upon combining components comprising
   (A) 100 parts by weight of oxyalkylene polymer having at least one silicon atom containing-group per molecule to which a hydroxyl group or a hydrolyzable group is bonded and capable of crosslinking through the formation of a siloxane bond,
   (B) about 0.1 to 20 parts by weight of bis(3-triethoxysilylpropyl)tetrasulfane, and
   (C) an amount of a condensation catalyst sufficient to effect cure of the composition upon exposure to moisture.

2. A curable composition according to claim 1, where the oxyalkylene polymer has a recurring unit represented by general formula $$-R^1-O-,$$

where $R^1$ is a substituted or unsubstituted divalent hydrocarbon group having 1 to about 8 carbon atoms.

3. A curable composition according to claim 2, where $R^1$ is selected from the group consisting of —CH(CH$_3$)CH$_2$—, —CH(C$_2$H$_5$)CH$_2$—, —C(CH$_3$)$_2$CH$_2$—, and —CH$_2$CH$_2$CH$_2$CH$_2$—.

4. A curable composition according to claim 1, where the oxyalkylene polymer has a number average molecular weight of about 500 to 50,000.

5. A curable composition according to claim 1, where the oxyalkylene polymer has a number average molecular weight of about 3,000 to 30,000.

6. A curable composition according to claim 1, where the silicon atom containing-group substituted on the oxyalkylene polymer is described by general formula $$-\!\!\left(\!\!\begin{array}{c}R^2_{2-a}\\|\\Si\\|\\X_a\end{array}\!\!-O\!\!\right)_{\!\!m}\!\!\begin{array}{c}R^2_{3-b}\\|\\Si\\|\end{array}\!\!-X_b$$

where each $R^2$ is an independently selected substituted or unsubstituted monovalent organic group having 1 to about 20 carbon atoms, X is a hydroxy group or a hydrolyzable group; a =0, 1, or 2; b=0, 1, 2, or 3; with the proviso that $1 \leq a+b$ and m is 0 or an integer of 1 to about 19.

7. A curable composition according to claim 6, where m=0.

8. A curable composition according to claim 6, where each X is independently selected from the group consisting of halogen atom, hydrogen atom, alkoxy, acyloxy, ketoximo, amino, amido, aminooxy, mercapto, and alkenyloxy groups.

9. A curable composition according to claim 6, where each X is an independently selected alkoxy group comprising 1 to about 6 carbon atoms.

10. A curable composition according to claim 6, where each X is independently selected from the group consisting of methoxy and ethoxy.

11. A curable composition according to claim 1, where the oxyalkylene polymer comprises 1.2 to 5 silicon atom containing-groups per molecule.

12. A curable composition according to claim 1, where the oxyalkylene polymer comprises 1.1 to 10 silicon atom containing-groups per molecule.

13. A curable composition according to claim 1, where the oxyalkylene polymer is an oxypropylene polymer having a number average molecular weight within a range of about 3,000 to 30,000 which is end-terminated with dimethoxymethylsilyl groups.

14. A curable composition according to claim 1 comprising 0.5 to 15 parts by weight of bis(3-triethoxysilylpropyl)tetrasulfane per 100 parts by weight of the oxyalkylene polymer.

15. A curable composition according to claim 1, where the condensation catalyst is a tin carboxylate.

16. A curable composition according to claim 1 comprising about 0.1 to 10 parts by weight of dibutyltin dilaurate as the condensation catalyst.

17. A curable composition comprising
   (A) 100 parts by weight of oxypropylene polymer having a number average molecular weight within a range of about 3,000 to 30,000 which is end-terminated with dimethoxymethylsilyl groups,
   (B) 0.5 to 15 parts by weight of bis(3-triethoxysilylpropyl)tetrasulfane, and
   (C) 0.01 to 20 parts by weight of a condensation catalyst selected from the group consisting of tin carboxylates.

18. A curable composition according to claim 17, where the condensation catalyst is dibutyltin dilaurate.

* * * * *